United States Patent [19]
Conway et al.

[11] Patent Number: 5,180,543
[45] Date of Patent: Jan. 19, 1993

[54] PASSIVE SAFETY INJECTION SYSTEM USING BORATED WATER

[75] Inventors: Lawrence E. Conway, Allegheny; Terry L. Schulz, Westmoreland, both of Pa.

[73] Assignee: Westinghouse Electric Corp., Pittsburgh, Pa.

[21] Appl. No.: 371,299

[22] Filed: Jun. 26, 1989

[51] Int. Cl.$^5$ ............................................. G21C 15/18
[52] U.S. Cl. .................................. 376/282; 376/299
[58] Field of Search ............... 376/282, 283, 298, 299, 376/293, 245

[56] References Cited

U.S. PATENT DOCUMENTS

| | | | |
|---|---|---|---|
| 4,046,626 | 9/1977 | Winkler et al. | 376/282 |
| 4,643,871 | 2/1987 | Fajeau | 376/282 |
| 4,939,754 | 7/1990 | Ekander et al. | 376/282 |
| 4,950,448 | 8/1990 | Gou et al. | 376/283 |

*Primary Examiner*—Daniel D. Wasil
*Attorney, Agent, or Firm*—Z. L. Dermer

[57] ABSTRACT

A passive safety injection system relies on differences in water density to induce natural circulatory flow patterns which help maintain prescribed concentrations of boric acid in borated water, and prevents boron from accumulating in the reactor vessel and possibly preventing heat transfer.

9 Claims, 6 Drawing Sheets

PASSIVE SAFETY INJECTION SYSTEM USING BORATED WATER

BACKGROUND OF THE INVENTION

1. Field of the Invention

This invention relates to the field of nuclear reactors, particularly of the pressurized water type, and is concerned with the fluid systems which operate following postulated events to provide required safety functions which includes providing emergency water addition to the reactor core following pipe breaks, providing a source of assured water addition for small leaks, removing reactor core decay heat from the reactor core, and assuring that the reactor core is subcritical.

2. Description of the Related Art

Present pressurized water reactor (PWR) designs have proven to be sound, safe performers. Recently, however, there has been wide spread interest in simplifying safety features of PWR designs so as to eliminate and/or reduce pumps, piping, instrumentation, etc., which tend to escalate the cost of building and maintaining plants.

An important manifestation of new development activities in the area of nuclear plant design is the use of passive rather than active safety features as well as simplified systems design.

Figure 1:
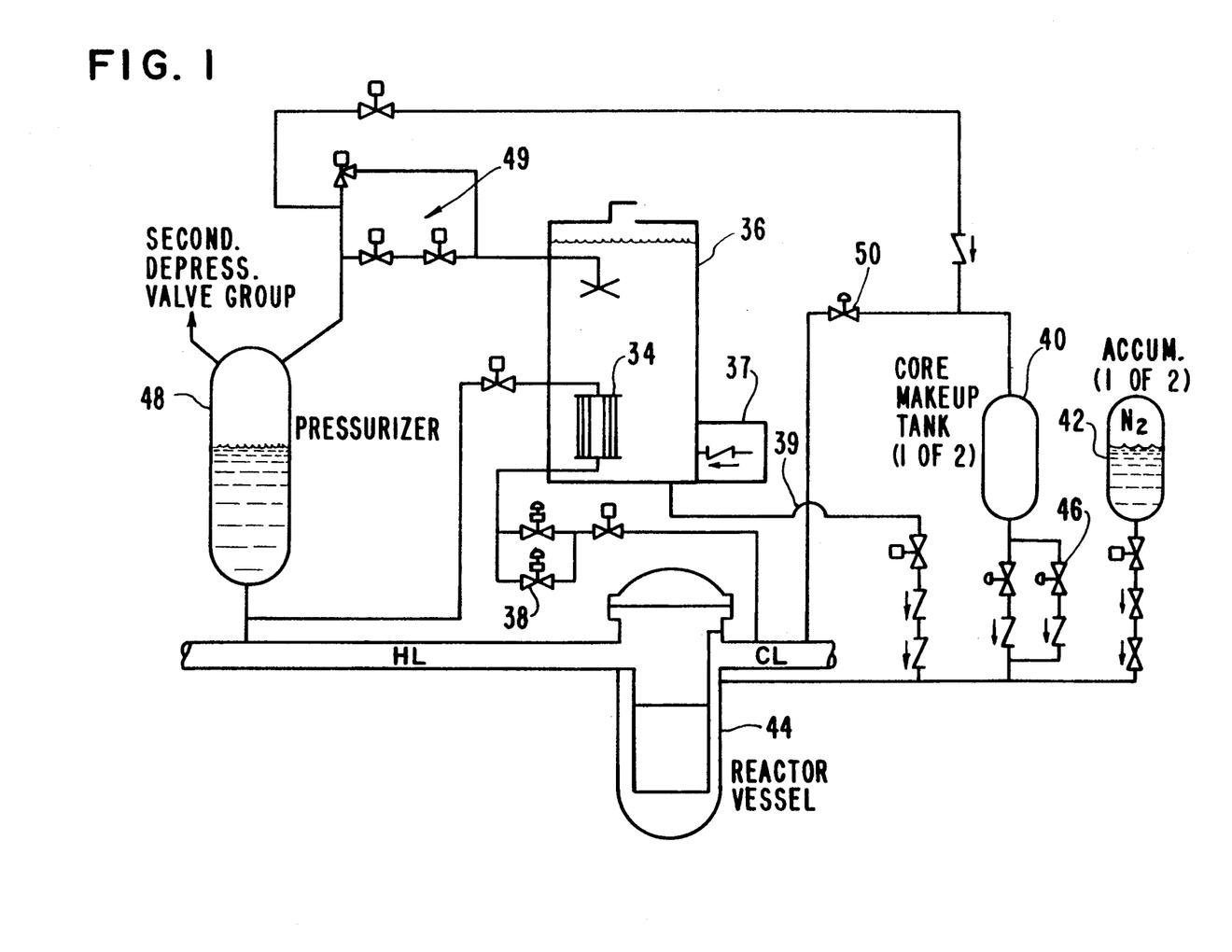
FIG. 1 is a schematic view showing components of a passive safety injection system which incorporate aspects of the present invention.

One such PWR design is described in U.S. Pat. No. 4,753,771 to Conway and Schultz (co-inventors herein). This patent describes a passive safety injection system (PSIS) which once aligned relies on natural forces such as gravity and natural circulation of water and air to provide all required safety functions. Portions of this PSIS is shown in FIG. 1, including a reactor vessel and core 44, and one or more reactor coolant system hot legs, cold legs, steam generator (not shown) and reactor coolant pumps (not shown) which are all of essentially conventional design. A pressurizer 48 is connected to one of the hot legs.

This previously patented pressure safety injection system (PSIS) is comprised of the following essential components:

1) A single passive residual heat removal heat exchanger 34 which is located above the reactor coolant system hot leg HL and cold leg CL and is connected at the top by a pipe attached to the hot leg HL and is connected at its bottom to the cold leg CL. This heat exchanger can remove reactor core decay heat when either normally closed valves 38 are opened. It transfers heat to water stored in the in-containment refueling water storage tank (IRWST) 36.

2) Two core makeup tanks 40 and their associated piping (one of two shown) which are located above the reactor coolant system hot leg HL and cold leg CL. This tank is completely filed with water and will drain by gravity into the reactor vessel 44 when either normally closed valves are opened and a) pressurizer 18 water level is below the top of the core makeup tank and the reactor coolant pump(s) is shut off or b) when the water inventory in the reactor coolant system is greatly reduced such that the cold leg(s) CL contains steam. The core makeup tank(s) 40 provide assured inventory makeup to the reactor and can provide sufficient flow to maintain core cooling following postulated ruptures of the reactor coolant system pressure boundary.

3) Two sets of depressurization valves 49 (one set shown) are provided at the top of the pressurizer. Each set of depressurization valves may contain multiple parallel flowpaths depending on the required flowrate vs. optimum/desired depressurization valve sizes. These valves are normally closed but are opened when the water level in the core makeup tank(s) 40 is reduced significantly. This action assures that the reactor coolant system is depressurized sufficiently so that water from the in-containment RWST 36 will begin draining by gravity into the reactor vessel 44 before the core makeup tank(s) 40 have completely drained.

4) The in-containment refueling water storage tank 36 (IRWST) is located above the reactor coolant system hot leg(s) HL and cold leg(s) CL and contains water which acts as a heat sink for operation of the passive RHR heat exchanger 34, quenches steam released during depressurization of the reactor coolant system, provides a longer term source of water injection by gravity into the reactor vessel in the event of a pipe break, and which floods the lower portions of the containment in which the reactor is housed such that the reactor coolant system is flooded above the hot leg(s) and cold leg(s). When the lower portion of the containment is flooded a long term (indefinite time) source of water makeup to the reactor vessel 44 is established from the flooded containment through piping conduits 37 and 39 which is driven by gravity.

These features in conjunction with a passive containment cooling system (not shown) described in the above patent, which transfer heat from the steel containment shell to the environment by natural convection results in condensing steam on the inside steel surface of the containment. This condensed steam (water) drains back to the lower portions of the containment and thus replenishes and maintains the water available for gravity drain into the reactor vessel storage tank 36 which serves as a heat sink. The bottom of the heat exchanger is located about 8 feet above the loops.

The heat exchanger 34 is actuated by opening either of the air operated valves 38 which fail open on loss of power or signal. If the reactor coolant pumps are operating, the flow through the passive residual heat removal heat exchanger 34 will force circulation from the higher pressure cold leg through the heat exchanger to the hot leg. In case the reactor coolant pumps are not available, the flow will be by natural circulation from the hot leg to the top of the passive residual heat removal heat exchanger 34 to the cold leg. The air operated control valves give the operator a means of controlling the reactor coolant system temperature to a constant value or if desired, to cool down the reactor coolant system.

The in-containment refueling water storage tank 36 will absorb decay heat for several hours before the water becomes saturated. However, it will take days to boil off sufficient water from the in-containment refueling water storage tank 36 before the heat removal capability degrades. This provides ample time to recover main or start feed water or to align the normal residual heat removal cooling equipment which is part of the spent fuel cooling system.

The passive heat exchanger 34 is made up of headers to which tubes are welded. The tubes are oriented vertically and are about 20 feet long. There are four headers which are arranged in parallel, separated by several feet to promote good mixing of the steam generated on the surface of the tubes with the water in the in-containment refueling water storage tank 36.

The passive residual heat removal heat exchanger replaces the safety grade auxiliary feed water system used in the past and does not rely on pumps, AC power or air/water cooling systems. The function of the passive heat exchanger is also not affected by failure of a steam generator pressure boundary, such as steam or feed line breaks or steam generator tube ruptures.

With respect to the passive safety injection function, passive reactor coolant makeup is provided to accommodate small leaks when the normal makeup system is unavailable and to accommodate larger leaks resulting from loss of coolant accidents (LOCA). Safety grade reactor coolant makeup and safety injection are provided by a set of water tanks: two core makeup tanks 40 (only one of which is shown in FIG. 1), two accumulators 42 (only one of which is shown in FIG. 1) and an in-containment refueling water storage tank 36. The core makeup tanks 40 are designed to provide makeup for small reactor coolant system leaks at any pressure and to provide safety injection for small LOCA. These tanks utilize gravity for their injection force. They are located above the reactor coolant loops and have a pressure balance line connected to the top of the tank to equalize pressures. Each of the core makeup tanks is full of borated water, and are designed for the same pressure as a reactor coolant system. The discharge from the core makeup tanks is from the bottom of each tank to a separate safety injection nozzel on the reactor vessel. The injection water enters the cold leg downcomer region 44. The discharge line is normally isolated by two parallel air operated valves 46 that fail open on loss of air pressure or control signal.

Two separate pressure balancing lines are provided for each core makeup tank 40. One line is from the top of the pressurizer 48 and another line is from a reactor coolant cold leg pipe. The line from the pressurizer is a small line that provides reactor coolant makeup following transients or whenever normal makeup is not available. This line is normally open and contains a check valve to prevent possible back flow or leakage from the cold legs which are at a higher pressure when the reactor coolant pumps are operating. In order to allow core makeup tank injection, the reactor coolant pumps are tripped when the pressurizer level reaches a low-low level.

The line from the cold legs to the core makeup tanks is a larger line that provides reactor coolant makeup capability as required for LOCA. This line is normally isolated by two parallel air operated valves 50 that fail open on loss of air pressure or control signal. If the cold legs become voided as they do during a LOCA, this line provides a greater flow of steam to the top of the core makeup tanks which allows for a greater flow of water to the reactor coolant system.

The accumulators 42 are required for large LOCAs because of the need for very high makeup flows to refill the reactor vessel downcomer and lower plenum. The accumulator tanks contain borated water with an over pressure of nitrogen.

Because there are limited volumes of water in the core makeup tanks and in the accumulators, additional sources of water are required in the longer term. The in-containment refueling water storage tank 36 is thus relied on as the longer term source of makeup water. However, in order to get injection from the in-containment refueling water storage tank, the reactor coolant system pressure must be reduced to about 10 PSIG above containment pressure. An automatic depressurization system is provided to accomplish this function. A series of valves connected to the pressurizer provide a phased depressurization capability. The discharge from these valves is sparged into the in-containment refueling water storage tank to minimize the consequences of a spurious opening of one of the depressurization valves. These valves are arranged in three stages with the first stage being smaller. The staging reduces the peak flow rates and the resulting load on the discharge pipes, spargers, and the in-containment refueling water storage tank.

After about 10 hours, the in-containment refueling water storage tank will also be empty. However, by that time the containment will be flooded above up to above the reactor coolant loop level and the water in the containment will drain by gravity back into the reactor coolant system. A stable long term core cooling/makeup to the reactor cooling system is thus established.

Figure 2:
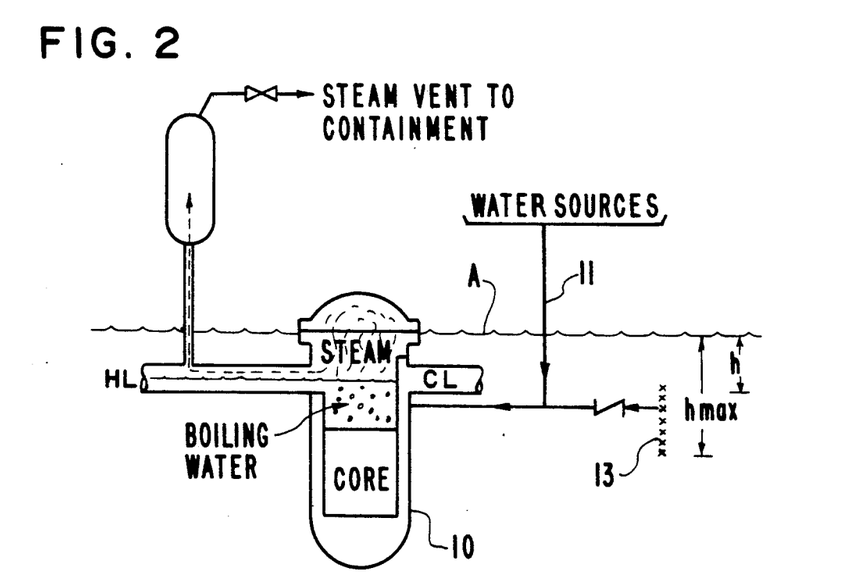
FIG. 2 is a schematic view showing the reactor vessel in a flooded containment.

Boron or borated water is generally known as a means of reducing or controlling nuclear reactor power due to boron's ability to absorb neutrons. However, the introduction of boron into the passive safety system concept presents a number of difficult problems. In order to assure the reactor remains subcritical after any postulated event, all the sources of water from the PSIS to the reactor vessel must contain boric acid solution. Referring to FIG. 2, the long term core cooling mode of the passive safety systems consist of boiling water in the reactor vessel and steam produced is vented to the containment were it is cooled/condensed and drained back to the flooded lower elevations of the containment building. Due to the continued boiling of water in the core region, the boron concentration can eventually become high enough in the core region to impede heat transfer. As water boils, it leaves the boron behind when the steam is vented to the containment through the pressurizer, and the boron thus becomes concentrated in the reactor vessel. The various water sources from the core makeup tanks and the water storage tank are fed into the reactor vessel through a line 11. Water in the containment is illustrated by the line A. Water drains from within the containment into the reactor vessel through a sump screen 13 by the difference in water head between the maximum water level A in the containment and the water level in the reactor vessel.

The core makeup tank 40 shown in FIG. 1 (only one of two shown) provides a source of water that can drain by gravity into the reactor at any prevailing pressure to make up water lost from the reactor coolant system due to small leaks or even the postulated rupture of the largest pipe. These tanks are designed to operate at full reactor pressure.

In the referenced patent, the two CMT's and their associated piping are sized to provide, by themselves, sufficient water to provide acceptable core cooling for even the largest postulated pipe rupture. In a larger reactor, a proportionally larger flowrate is required to rapidly refill the reactor and reflood the reactor core following a postulated severance of the largest reactor coolant system pipe. This would require that the core makeup tanks and their associated piping become proportionately larger in volume and area respectively. This direct scale-up approach would not be the most cost effective means of achieving higher injection flowrates and may become impractical.

The depressurization valves and associated piping shown in FIG. 1 assure that the reactor coolant system pressure can be reduced sufficiently and in a timely manner such that the reactor pressure is less than the elevational head of water stored in the in-containment refueling water storage tank before the core makeup tank(s) have completely drained.

In a larger reactor application, the size (areas) of the depressurization valves and associated piping must be increased proportionately to achieve a similar depressurization rate and pressure. For large reactors with the depressurization arrangement shown in FIG. 1, the number of depressurization valves and/or valve and piping size may become impractical and not the most cost-effective solution.

The preferred embodiment of the above patent was for a "small" nuclear reactor (45 million watt thermal output). In order to apply the passive safety system concept in the above referenced patent to a "large" commercial sized nuclear reactor (500 to 4,000 million watt thermal output) in the most economical fashion some specific modifications are preferred, namely the preferred embodiment of the previously referenced patent was based on the fact that only control rods (inserted by gravity into the reactor core region) were used to effect nuclear shutdown of the core. These rods were also mechanically positioned to control and/or change reactor power. In larger power reactors, boric acid dissolved in the reactor coolant water is used in conjunction with control rods to control reactor power, to compensate for fuel depletion, to compensate for increase water density when the reactor is at cold conditions, and to ensure past-accident nuclear shutdown. The combined use of boric acid solution with mechanical control rods reduces the number of control rods required, simplifies the mechanical design of the reactor, and promotes a more even level of power generation in individual fuel rods. These result in significant reductions in the initial cost of the plant and permits a higher power generation level to be achieved.

SUMMARY OF THE INVENTION

An object of the present invention is to provide a passive safety injection system which uses borated water and prevents boron from concentrating in the reactor vessel and possibly preventing heat transfer in the reactor core.

Another object of the present invention is to improve a passive safety injection system by creating natural circulatory flow patterns.

Another object of the present invention is to improve a passive safety injection system for application to larger sized nuclear reactors by providing an alternate method of supplying water at high flowrates following the postulated severance of a large reactor coolant system pipe.

Another object of the present invention is to improve a passive safety injection system by improving the means to depressurize the reactor coolant system in order to be able to drain water by gravity into the reactor vessel from an elevated source of water.

These and other objects of the invention are met by providing a passive safety injection system for a nuclear power plant including a containment, a reactor vessel having a core, a hot leg, a cold leg, and a borated water supply for injecting into the reactor core during a loss of coolant accident in which the containment if flooded, the system including a first flow path coupled to the hot leg below the flood up level of water in the containment, and being in communication with the containment, and a second flow path coupled to the reactor vessel and being in communication with the containment, the first flow path inducing a natural circulatory flow of water from within the containment through the reactor core based on differences in water density produced by the reactor core to thereby preventing concentration of boron in the reactor vessel.

In another aspect of the invention, a passive safety injection system for a nuclear power plant includes a reactor vessel having a core, a hot leg and a cold leg coupled to the reactor vessel, a pressurizer coupled to the hot leg, a core makeup tank having a discharge line connected to the reactor vessel and a pressure balance coupled to the pressurizer, wherein the pressurizer has a normal water level and the core makeup tank is located substantially below the pressurizer normal water level, and wherein the core makeup tank contains borated water having a higher concentration of boric acid then water in the reactor coolant system, and wherein after cool down the reactor coolant system water volume shrinks and thereby automatically allows the core makeup tank to drain into the reactor vessel and increase the reactor coolant boric acid concentration.

In another aspect of the present invention, a passive safety injection system for a nuclear power plant including a reactor vessel having a core, a hot leg and a cold leg, the system including a core makeup tank which is filled with borated water at a predetermined concentration of boric acid and having a drain line for draining the contents thereof into the reactor vessel and a pressure balance line connecting a top of the core makeup tank to the cold leg, a vent coupling the pressure balance line of the core makeup tank, the vent inducing a natural circulatory flow of borated water from within the core makeup tank to the reactor vessel by means of hot water rising into the pressure balance line and flowing into the core makeup tank through the vent.

The foregoing and other objects and advantages of the passive safety injection system in accordance with the present invention will become more apparent from the following detailed description, taken in conjunction with the drawings.

DETAILED DESCRIPTION OF THE PREFERRED EMBODIMENTS

Figure 3:
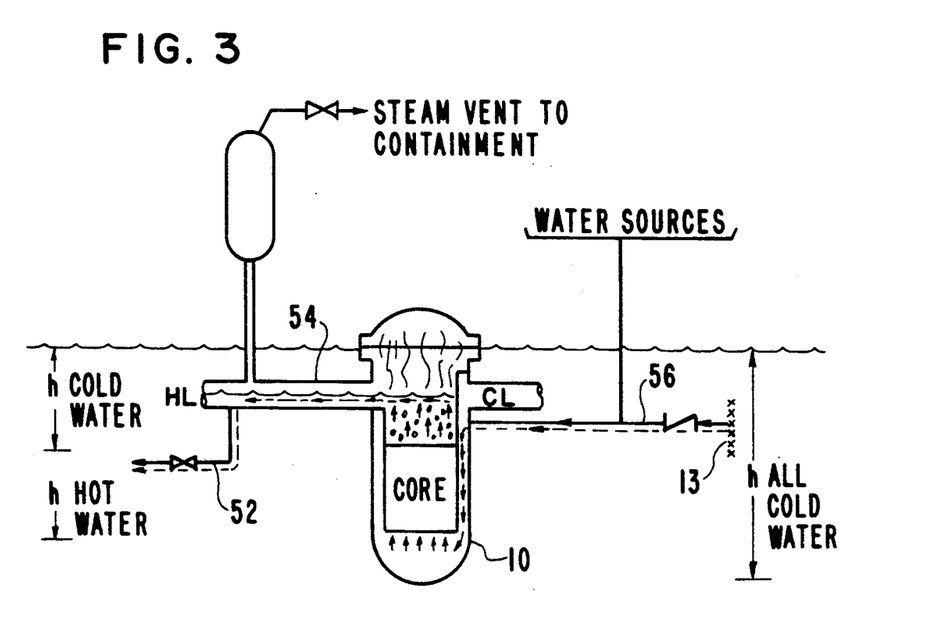
FIG. 3 is a schematic view of a reactor vessel including one aspect of the present invention.

Referring to FIG. 3, a first aspect of the present invention is to provide a flow path 52 from the reactor coolant system hot leg 54 to the flood up level in the containment (but above the top of the core elevation). This flow path provides for a circulatory flow of water from the containment through the core as indicated by the broken lines and arrows which limits the concentration of boron from in the reactor vessel in the long term cooling mode. The flow path 52 is attached at the bottom of the hot leg 54 so that steam can vent through the upper portion of the pipe. The added dilution flow path is below the flood up water elevation but high enough to achieve natural circulation driven by the lighter (heated) water in and above the core. With the hot leg flow path 52, containment water flows through the core to keep the boron concentration low. Natural circulation of water is shown by the broken lines and arrows and is driven by the differences in water densities.

The flow path 52 (one of two shown) works in conjunction with the flow path 56 (one of two shown) which includes a sump screen 13 for communicating water from within the containment into the reactor vessel. A portion of the second flow path is also used to introduce borated water from the passive safety injection system from the various sources, such as the core makeup tanks and the accumulators, as compared with the previous invention shown in FIG. 3 where the normal flow is simply to introduce containment water into the reactor vessel 10 through the second flow path. However, the water is boiled off the core, boron accumulates in the reactor vessel, thereby creating a dangerous situation in which the ability of the reactor core to effect heat transfer is diminished. The flow path 52 thus induces a natural circulatory flow of water from the water flooding the containment through the reactor core based on the differences in water density produced by the heating of water by the reactor core, thereby limiting the concentration on boron in the reactor vessel.

Figure 4:
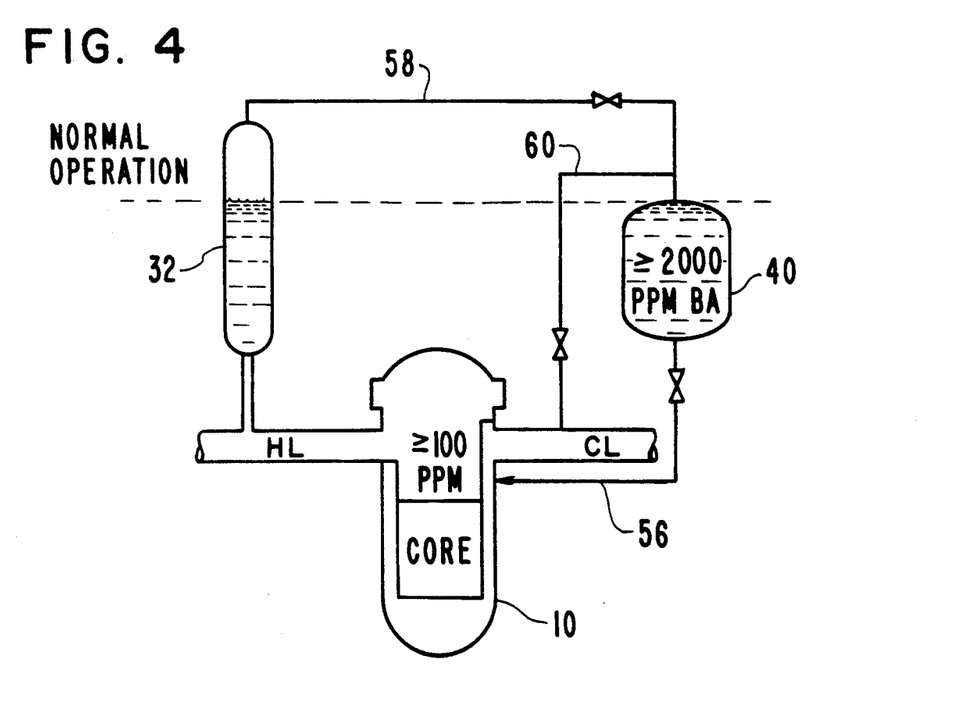
FIG. 4 is a schematic view showing the reactor vessel in a normal operation mode.
Figure 5:
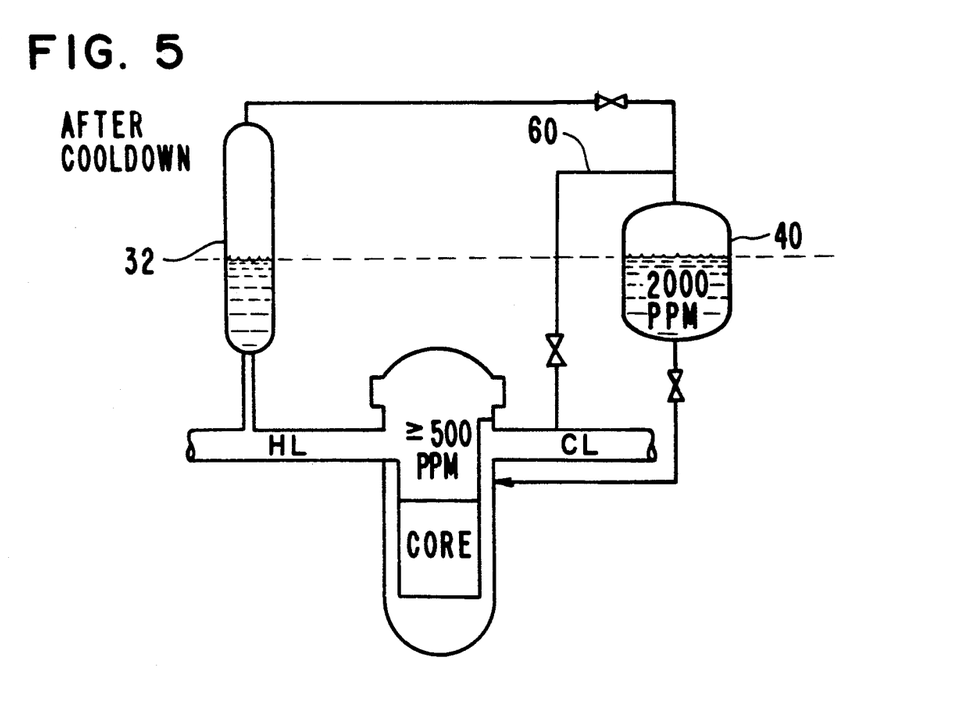
FIG. 5 is a schematic view of the reactor vessel after cool down, and illustrating another aspect of the present invention in which borated water flows out of the core makeup tank.

Another problem associated with the use of borated water is that in a pressurized water reactor you need to increase the concentration of boron in the reactor when you go from hot to cold conditions while maintaining the core in a subcritical condition. According to the present invention, the core makeup tank elevation relative to the pressurizer elevation and core makeup tank boric acid concentration can be established to ensure that sufficient borated water will be drained by gravity from the core makeup tanks to achieve the required cold shut down boric acid concentration. As shown in FIG. 5, the core makeup tank and pressurizer elevation are established, along with the core makeup tank boric acid concentration, such that when the reactor coolant system water is cooled and shrinks in volume, sufficient core makeup tank boric acid solution will drain into the reactor coolant system to raise the overall concentration to that required to keep the reactor sub-critical. FIG. 4 represents the normal operation with the reactor coolant system water volume at around 6,000 cubic feet. The water in the reactor vessel contains less than 100 parts per million boric acid, while the core makeup tank may contain greater than or equal to 2,000 ppm boric acid. The core makeup tank is located substantially below the pressurizer normal water level. Balance lines 58 and 60 are also illustrated schematically, while flow path 56 connects the core makeup tank to the reactor vessel 10.

After cool down, and referring to FIG. 5, the reactor core system water volume shrinks allowing the core makeup tank 40 to drain into the reactor vessel 10 thereby increasing the reactor coolant system boric acid concentration. Thus, high concentration boric acid in the core makeup tanks drain into the reactor coolant system to make up for water shrinkage, and thereby achieves a concentration in the reactor vessel of greater than or equal to about 500 PPM boric acid.

Figure 6:
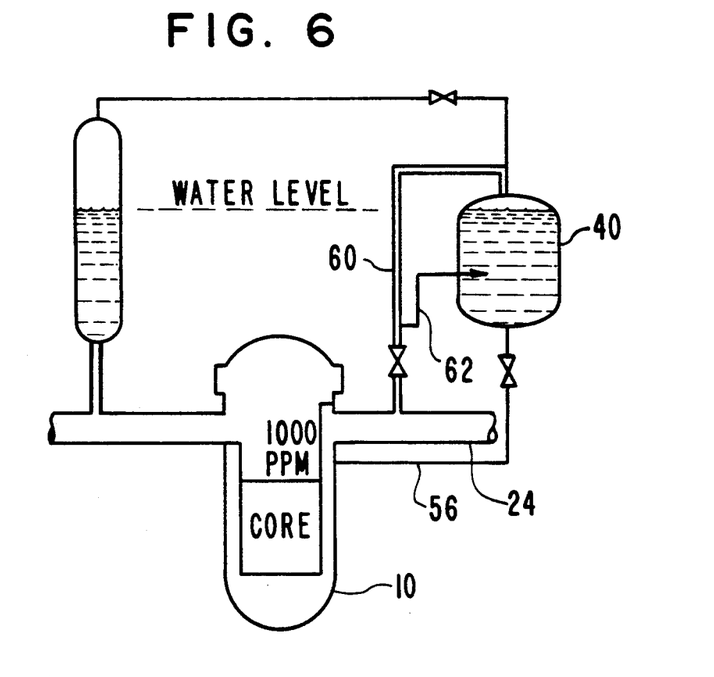
FIG. 6 is a schematic view of the reactor vessel showing another aspect of the present invention.
Figure 7:
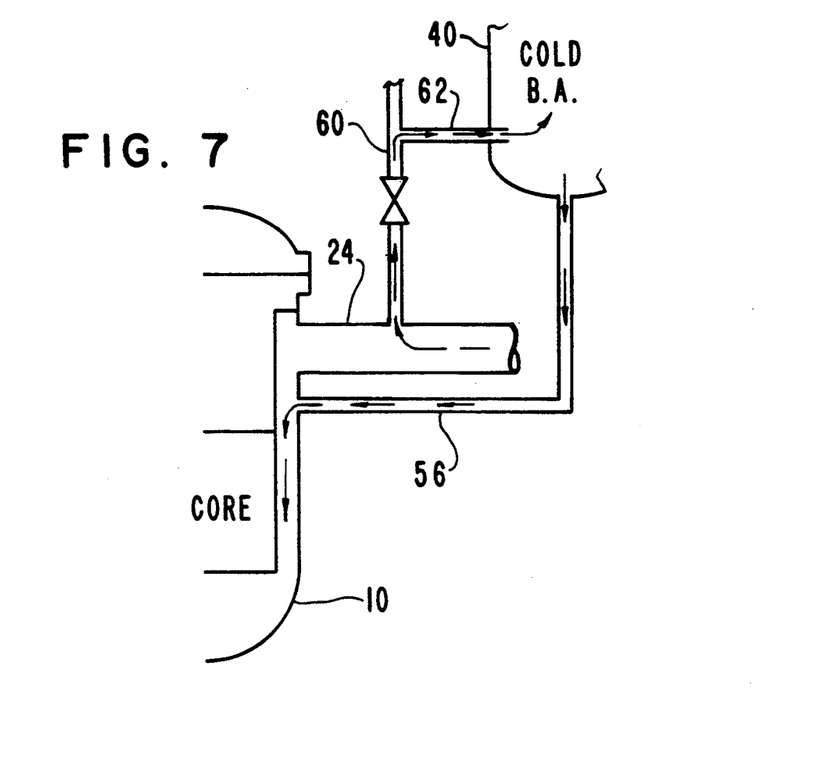
FIG. 7 is an enlarged, schematic view of a portion of FIG. 6.

An alternative to the partial draining of the core makeup tanks compensating for water shrinking discussed above with respect to FIGS. 4 and 5 is to create a natural circulation flowpath to mix the high concentration boric acid solution in the core makeup tank with the low concentration boric acid solution in the reactor coolant system. Referring to FIGS. 6 and 7, an alternative embodiment is illustrated in which the normal mode of operation would be the same as what is illustrated in FIG. 4. However, in this embodiment, a flow-path 62 is provided between the core makeup tank 40 (which is full of cold borated water) and the pressure balance line 60 which connects the top of the core makeup tank with the cold leg 24. The boration mode illustrated in FIG. 6 can be accomplished prior to the cool down since it is not necessary for the water level to shrink. The circulation flow is illustrated in FIG. 7, which is an enlargement of the broken circle portion of FIG. 6. Basically, hot water rises from the cold leg 24 into the pressure balance line 60 and then through the vent 62 into the core makeup tank 40. The hot water forces the cold core makeup water containing boric acid into the reactor coolant system. An equilibrium boric acid concentration of about 1,000 PPM is achieved as a result of the natural circulation induced by the vent 62.

Figure 8:
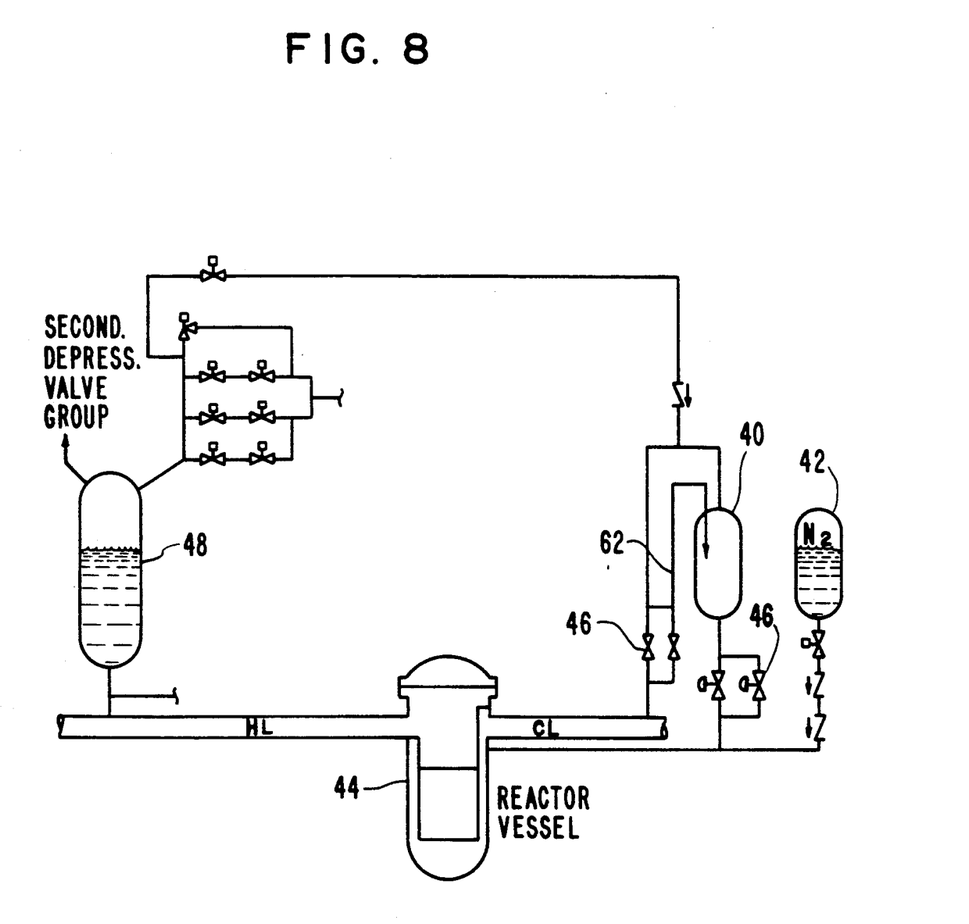
FIG. 8 is a schematic view of the aspect of the present invention which was illustrated in FIGS. 6 and 7.

FIG. 8 is another illustration of the embodiment described with reference to FIGS. 6 and 7. The vent 62 has a pipe segment which extends into the core makeup tank 40 and terminates at an elevation below the depressurization system actuator core makeup tank level. The valves 46 are preferably located at or below the depressurization system actuation core makeup tank level. When the reactor coolant pumps are running, the pressurizer is about 60 PSIG less than the cold leg. Thus, check valves will be closed and the pressure difference between the core makeup tank inlet/outlet will be small. Borated water in the core makeup tanks will be mixed simply when the operator opens the core makeup tank inlet/outlet. As the reactor coolant system water shrinks, the pressurizer level will fall and the reactor coolant pumps will trip. Thus, the core makeup tank level and pressurizer level will equilibriate.

When the reactor coolant pumps are not running, the natural circulation flow path will allow approximately 100 to 200 gallons per minute from the cold leg to the cold core makeup tank.

Another aspect of the present invention incorporates use of two accumulators (one shown in FIG. 1) (tanks partially filled with water with a pressurized covergas such as nitrogen) which provide additional water flow to the reactor in the event of a large pipe break, when the required water addition rate is highest. These tanks deliver water to the reactor when the reactor coolant pressure falls below the nitrogen covergas pressure. This feature permits the high design pressure CMT's and associated piping to be reduced in size since the highest required flow for core cooling after a large pipe break can be initially provided by the accumulators, followed by a lower flow from the CMT's. The check valves provided in the core makeup tank discharge line prevent water from the accumulator from going into the core makeup tank which may be partially drained with accumulator injection. Also since the accumulators can be designed for a lower pressure (corresponding to the covergas pressure of about 100 psig), equipment cost can be reduced.

Figure 9:
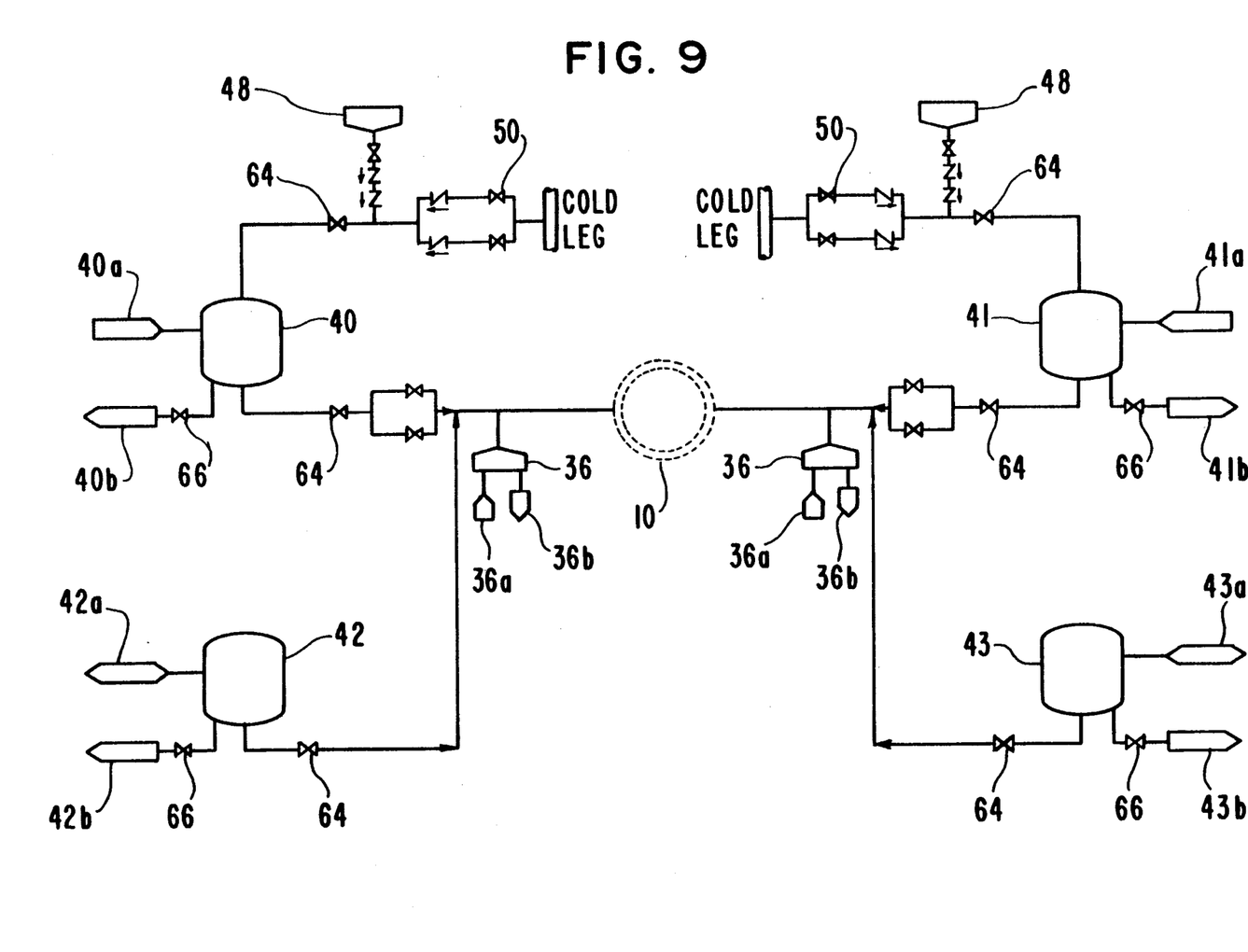
FIG. 9 is a schematic view illustrating another aspect of the present invention.

Another aspect of the present invention is illustrated in FIG. 9 in which the core makeup tanks 40 and 41 are provided with fill, drain and sample capability, schematically illustrated by fill and sample lines 40a, 41a, and drain lines 40b and 41b. Similar fill, drain and sample capabilities are provided for the accumulators 42 and 43, as well as the in-containment refueling water storage tank 36. The fill lines 40a, 41a, 42a, 43a and 36a are used to inject water into the respective tanks with an appropriate concentration of boric acid in order to adjust the concentration in the tanks to a desired level. Thus, in a sampling mode, borated water is removed and sampled from the drain and sample lines 40b, 41b, 42b, 43b and 36b to determine the concentration of boric acid. If the concentration is determined to be low, higher concentration boric acid can be injected into the respective tanks through the fill lines while simultaneously removing an equal volume from the drain lines until the desired concentration level is achieved. A refilling supply tank (not shown) can be temporarily or permanently connected to the fill lines.

The various tanks containing borated water are isolated normally from the reactor coolant system by means of isolation valves 64 which prevent the contents of the tanks from entering the reactor coolant system. The drain and sample lines 40b, 41b, 42b and 43b include isolation valves 66 to ensure that accidental drain does not occur.

The two parallel normally closed valves 50 which are in the pressure balance line from the reactor coolant system cold legs to the top of each core makeup tank are actuated to their open position simultaneously with the parallel core makeup tank discharge isolation valves, on receipt of a core makeup tank actuation signal. Thus, the balance line can be used to permit a large amount of steam to float to the top of the core makeup tank which results in a high flow rate of water to the reactor coolant system from the core makeup tank.

It will be recognized by those of skill in the art that numerous modifications and additions may be made to the various structures and the systems disclosed herein and thus it is intended by the appended claims to encompass all such modifications which fall within the true spirit and scope of the invention.

We claim:

1. A passive injection system for a nuclear power plant including a containment, a reactor vessel having a core, a hot leg in communication with the core, a cold leg, and a borated water supply for injecting into the reactor core during a loss of coolant accident in which the containment is flooded, comprising:
   a first flow path extending from the hot leg at a point below the flood up level of water in the containment, and providing a passageway from the hot leg to the containment; and
   a second flow path extending from the reactor vessel and providing a passageway from the containment to the reactor core;
   the first and second flow paths providing means for inducing a natural circulatory flow of water from within the containment through the reactor core based on differences in water density produced by the reactor core to thereby prevent concentration of boron in the reactor vessel,
   wherein the first flow path is coupled to a bottom of the hot leg so that steam can vent through an upper portion of the pipe, and wherein the first flow path is coupled to the hot leg at an elevation at the top of the reactor core and below the flood up water level in the containment thus establishing a circulatory flow of water from the containment through the core based on differences in water density.

2. A passive safety injection system for a nuclear power plant including a reactor vessel having a core, a reactor hot leg and a cold leg, the system comprising:
   a core makeup tank which is filled with borated water at a predetermined concentration of boric acid and having a drain line for draining the borated water into the reactor vessel and a pressure balance line connecting a top of the core makeup tank to the cold leg;
   a vent coupling the pressure balance line to the core makeup tank,
   the vent inducing a natural circulatory flow of borated water from within the core makeup tank to the reactor vessel by means of hot water rising into the pressure balance line and flowing into the core makeup tank through the vent.

3. A passive safety injection system as recited in claim 2, wherein the natural circulatory flow is induced prior to cool down.

4. A passive safety injection system for a nuclear power plant comprising:
   a reactor vessel having a core;
   a reactor coolant system in communication with the reactor vessel;
   at least one in-containment refueling water storage tank in communication with the reactor coolant system;
   at least one core makeup tank in communication with the reactor coolant system;
   at least one accumulator in communication with the reactor coolant system,
   the in-containment refueling water storage tank, the at least one core makeup tank and the at least one accumulator being filled with borated water; and
   means for filling, draining, and sampling the contents of the in-containment refueling water storage tank, the at least one core makeup tank, and the at least one accumulator to maintain a specified concentration of boric acid in the borated water.

5. A passive safety injection system as recited in claim 4, further comprising isolation valves associated with each of the in-containment refueling water storage tank, the at least one core makeup tank, and the at least one accumulator to prevent movement of borated water into the reactor coolant system.

6. A passive injection system for a nuclear power plant including a containment, a reactor vessel having a reactor core, and a reactor coolant system comprising:
   a borated water supply flowable substantially by gravity into the reactor core during a loss of coolant accident; and
   means for filling, draining and sampling the borated water supply to maintain specified concentration of boric acid in the reactor core.

7. A passive injection system as recited in claim 6, wherein the borated water supply includes at least one core makeup tank, at least one accumulator tank and an in-core refueling water storage tank.

8. A passive injection system as recited in claim 7, wherein the filling, draining and sampling means includes a fill line associated with each tank, and a drain and sample line associated with each tank.

9. A passive injection system as recited in claim 8, further comprising isolation valves associated with each tank to isolate the borated water from the reactor coolant system.

* * * * *